Figures 2, 3:
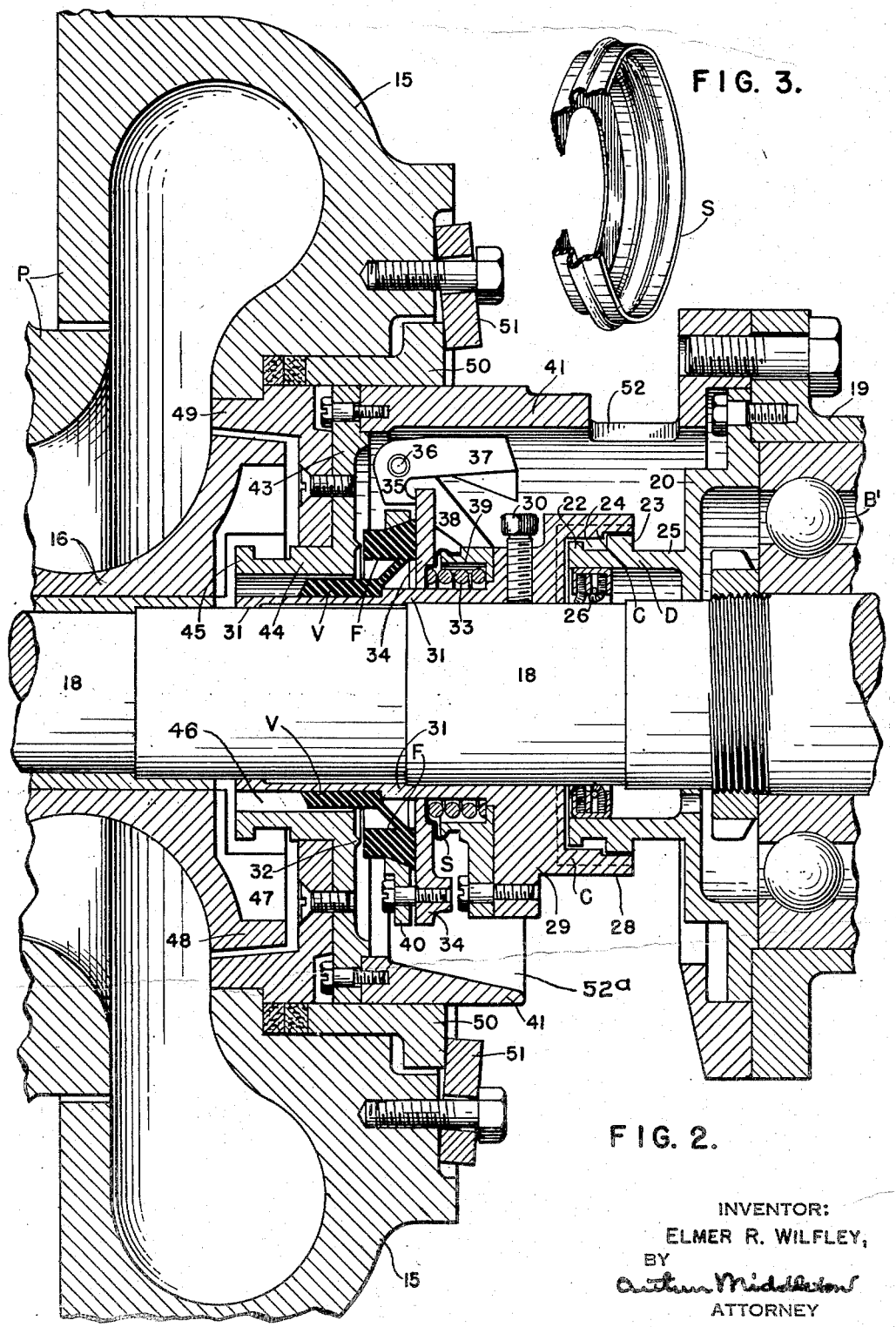

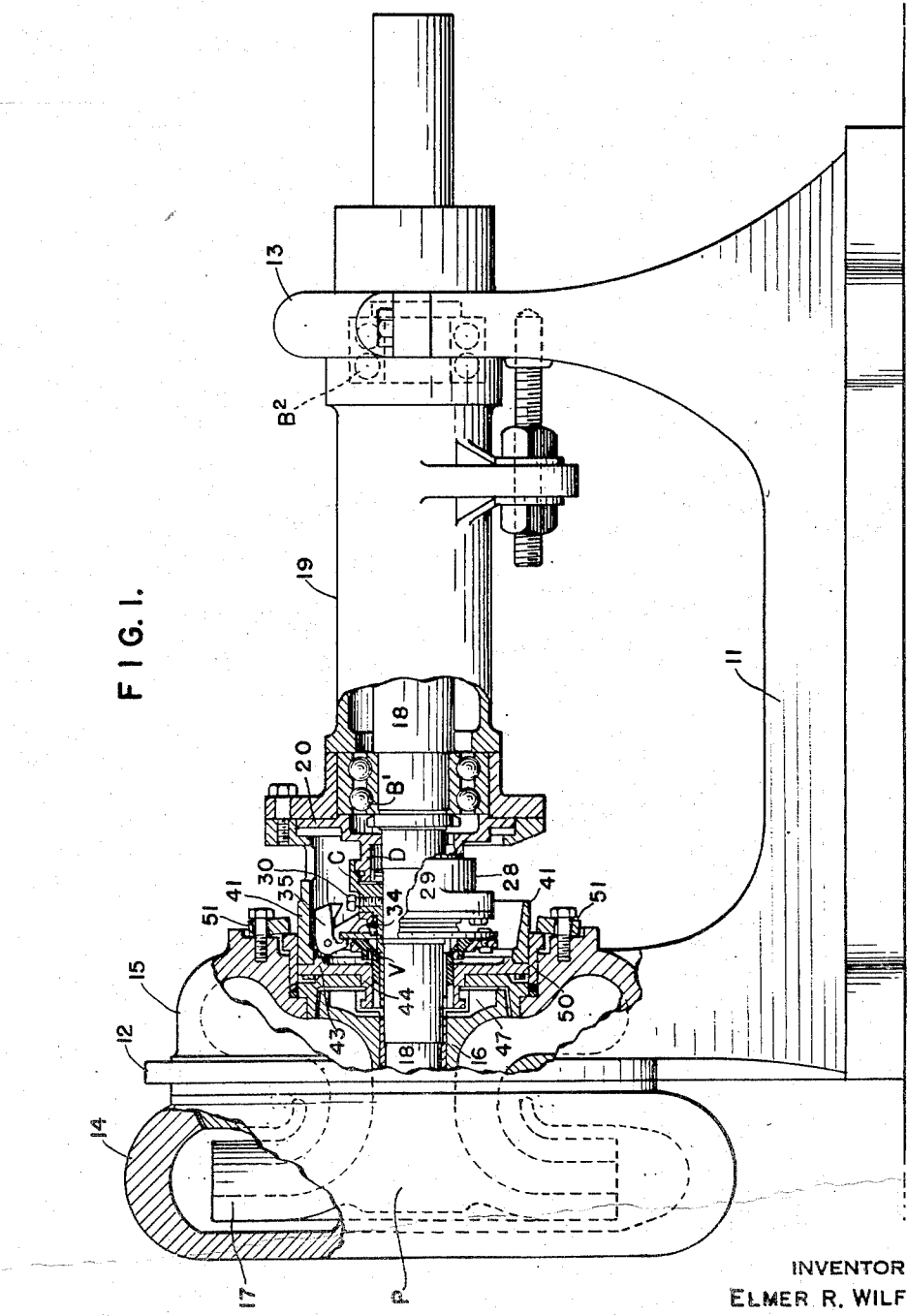

INVENTOR:
ELMER R. WILFLEY,
BY
ATTORNEY

Aug. 26, 1952   E. R. WILFLEY   2,608,423
SHIELDING DEVICE FOR ANTIFRICTION BEARINGS
Filed Aug. 11, 1949   3 Sheets-Sheet 3
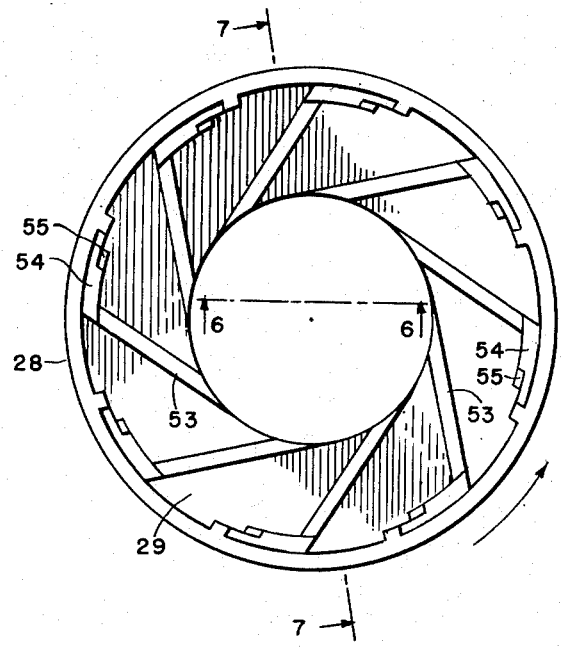
FIG. 4.
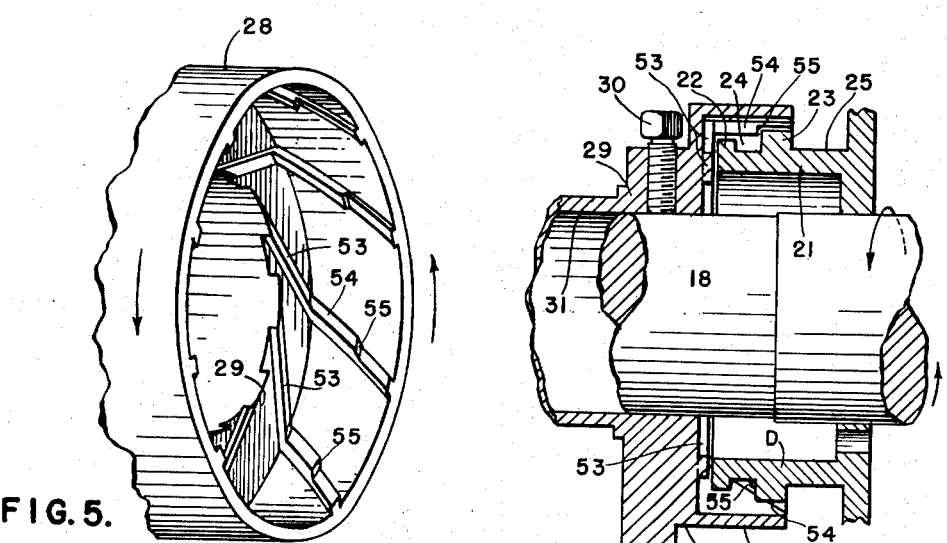
FIG. 5.
FIG. 7.
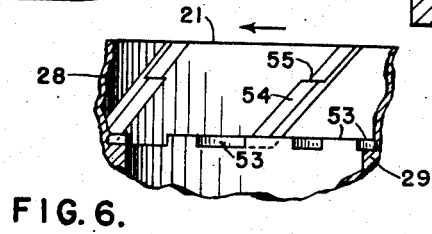
FIG. 6.
INVENTOR:
ELMER R. WILFLEY,
BY
Austin Middleton
ATTORNEY Patented Aug. 26, 1952

2,608,423

UNITED STATES PATENT OFFICE 2,608,423

SHIELDING DEVICE FOR ANTIFRICTION BEARINGS

Elmer R. Wilfley, Denver, Colo., assignor to A. R. Wilfley and Sons, Inc., Denver, Colo., a corporation of Colorado Application August 11, 1949, Serial No. 109,710

4 Claims. (Cl. 286—5)

This invention relates to radial or journal bearings for rotary shafts and more particularly to improvements in devices associated with the bearing block and with the shaft for preventing or discouraging entry into the bearing of damaging material. More particularly, this invention relates to improvements in labyrinthine type of bearing-protective shielding devices employing one fixed and one rotary complementary labyrinthic members. The narrow labyrinthic path between these members together with centrifugal force set up by the relative motion between the rotary and the fixed member discourage entry therebetween of bearing-damaging material.

It is among the objects of this invention to improve the effectiveness of such a shielding device by improving its centrifugal expelling or resisting action to suspended solids. That object is attainable by the use of this invention which provides a rotary member that is substantially cup-shaped to surround and cap a cylindrical stationary drum-like member extending from the bearing block, with a labyrinthine passage between the members. The inner face of the rotary cup is provided effectively with ribs for expelling suspensions of bearing-damaged material that may otherwise have a tendency to enter between the members.

For example, such a journal shielding device is employable in centrifugal pumps for handling suspended solids that are abrasive or corrosive, known variously as sand pumps, sludge pumps, and slurry pumps, since in such pumps the radial bearing that supports the impeller shaft nearest the pump housing is exposed to attack by such suspensions that may leak from the pump housing passed and along the impeller shaft.

Such a pump is exemplified in the patent to Wilfley, No. 1,976,532, which shows an axially non-shiftable impeller shaft encircled by an annular resilient diaphragm-like type of valve which is shiftable axially upon the shaft for opening or closing a gap around the impeller shaft. In that patent, the shifting is effected automatically by valve-shifting mechanism whereby the valve is normally held in closing position by spring pressure when the pump is not operating. When the impeller shaft starts rotating, a set of centrifugally operated weighted levers function against the pressure of the spring, to shift the valve from its closing position and the valve remains open while the pump is running. Meanwhile, leakage through the annular gap is counteracted by an auxiliary impeller which is coaxial with the impeller shaft and rotates therewith. Rotation of the auxiliary impeller creates hydraulic pressure opposing the tendency of leakage of fluid through that gap. When the pump stops running, the valve shifts gradually from open to closing position due to the spring pressure as the hydraulic sealing pressure from the auxiliary impeller dies down along with the waning of the centrifugal force which otherwise shifts the valve against the spring pressure.

In that pump, a bearing shielding device of labyrinthic type is disposed between the valve-shifting mechanism and the bearing, and that device derives supplementary protection against damaging fluids by a shell or skirt which in that disclosure encloses and rotates with the rotary parts of the valve-shifting mechanism. Therefore, it is among the objects of this invention to devise an arrangement such that the effectiveness of the labyrinthic bearing-shielding device is rendered independent of and non-reliant upon any protection derived from parts of the valve-shifting mechanism, so that such protective skirt can be eliminated.

Other objects include simplifying and rendering more compact such bearing-shielding means for assuredly preventing suspended solids from interfering with the proper operation of the valve-shifting mechanism of the pump.

Such a pump usually has its pump housing fixed to a base and there is a rotatable horizontal impeller shaft extending at one end into the pump housing and at its other end by spaced-apart anti-friction bearings carried one at the pump end of a tubular shell supported from the base and one at the other end of the shaft with each bearing having a fixed part or block and a rotating part encircling and supporting the shaft. A cage is fixed to the pump-end of the shell and within the cage are automatic centrifugally operated means for shifting or flexing the resilient valve into closing and non-closing positions. When in one position, because there is no stuffing box between the shaft and the pump housing, there is some leakage back into the cage of the suspension being pumped, so it is one object of this invention to protect the pump-end bearing for the shaft against damage by contact therewith of the abrasive suspension or slurry.

In an embodiment of this invention the centrifugally operated means in the cage for flexing the resilient valve comprise weighted levers supported from a hub fixed on the shaft to rotate with it, and these levers at their free non-weighted ends bear against a disc slidably mounted from the shaft that also rotates therewith to move the disc in one direction and spring means are provided for returning the disc to its initial position. Since these spring means are also within the cage, another object of this invention is to protect them too against damage by contact therewith of the abrasive suspension being pumped.

A further object is to assemble these parts for accomplishing these objects so as to take up a minimum of length, while a still further object is to assemble these parts in a way that makes for ready disassembly in case of need.

One of these objects is realizable by an assembly which comprises providing a flange-carrying stationary open-ended cylindrical drum-like member extending toward the pump from the fixed part of the bearing nearest the pump-housing with cylinder-capping cup-like means extending toward that bearing from the shaft and rotatable therewith. The fixed open-ended drum and the rotating cup means covering the open end portion of the cylinder function by means of centrifugal force exerted by the cup, to resist entrance of slurry, or other suspension being pumped, between the rotating cup and the fixed drum by impelling away therefrom any such slurry that would otherwise pass into the drum and thus reach the bearing. This effect can be stimulated by coaction between certain kinds of projections extending outwardly on the drum leaving grooves therebetween and inwardly on the cup, but these will be described later.

Another of these objects is realizable by providing for the cup, a hub extending toward the pump housing secured to be rotatable with the shaft and carrying in such rotation the encircling spring and the disc against which bears the spring and the centrifugally operated lever means, and also providing a flexible cover for the spring contacted by the disc and rotatable with the hub of the cup.

The foregoing structure gives such a pump structure that has a minimum length, and another object is realizable by the foregoing assembly plus a removable closure head on the pump-end of the cage. Thus when the pump housing and then the impeller are removed as usual, the closure head is then removed from the cage with the shaft still in place, whereupon the operator can reach a set-screw securing the hub of the cap to the shaft. With this screw loosened, the operator can then pull or slide towards him, the cup-carrying hub on which is supported an assembly comprising the pivoted levers, the disc against which they operate, the spring that bears on that disc against pressure of the levers when centrifugally operated; and the flexible cover means on the spring. The fixed drum remains in place on the shaft after the hub-carried assembly is thus removed. Other objects as well as features of advantage will appear as this specification proceeds.

The best embodiment of this invention now known to me has been chosen as an example for illustration herein but it is to be understood that changes can be made so long as they or their equivalents fall within the ambit of the appended claims.

This embodiment has been illustrated in the accompanying drawings in which—

Fig. 1 shows a side elevation of my improved pump with parts in section. Fig. 2 is a vertical sectional enlarged view of the sectioned parts shown in section in Fig. 1. Fig. 3 is a partial isometric view of the resilient cover for the spring. Fig. 4 is a plan view of the rotatable drum-capping cup-like member looking from right to left in Figs. 1 and 2. Fig. 5 is a partial isometric view of the member of Fig. 4. Fig. 6 is an enlarged detail of that member, while Fig. 7 shows enlarged details of that member and its cooperating fixed drum.

In the drawings, the base 11 of the pump has two upright standards 12 and 13. The pump housing, represented generally by the letter P, is made up of removable and separable housing section 14 and housing section 15 suitably held on each side of standard 12, together with another housing part that is a contoured or coned nose plate 16, which latter with the pump runner or impeller 17 is rotatably carried by impeller shaft 18 entering the pump housing and supported at its other end from anti-friction bearings $B^1$ and $B^2$ held in a tubular shell 19 supported in turn from standard 13 uprising from the base 11.

Supported from the left hand end of the shell 19 is a plate 20 carrying an open-ended fixed drum-like extension D contoured to present exteriorly thereof a smaller end flange 22 and another larger flange 23 with an inner circumferential solids-receiving groove 24 therebetween. Between the larger flange 23 and the carrying plate 20 is a circumferential uncovered outer wider and deeper solids-receiving groove 25. The open end of the drum D is closed as at 26 by a stuffing box or equivalent sealing member to stop any suspended solids being pumped from entering that open end.

Capping the open end of the drum D is a rotary cup-like expeller member C having a cylindrical body portion 28 and a head or bottom portion 29 through which passes a set-screw 30 for securing the cup to rotate with the rotatable impeller shaft 18. The head 29 of the cup terminates in a hub 31 encircling the shaft. Frictionally encircling the hub is a resilient canvas-reinforced diaphragm-like valve V made up of a neck portion that grips the hub from which inclines a septum having a laterally extending flange F that is much thicker than the septum and presents a flat face. The septum flexes so that the flange can shift back and forth while the neck remains unchanged. When the flange is flexed to move toward the left, it engages in sealing or closing position with the annular ridge 32. While the neck remains unchangedly positioned on the shaft 18, the septum is flexed automatically to the left by spring 33 that encircles the shaft 18 and normally bears against disc 34 (that rotates with the hub 31) to move it to the left and thus shift or flex the thickened flange F of the septum of the diaphragm V so that it contacts the sealing annular ridge 32 and is thus in closed position. Disc 34 is slid or shifted in the opposite direction, against spring pressure thereon, by means of centrifugally operated levers 35 pivoted at 36 and provided with weights or weighted arms 37. These levers are supported from the hub 31 by arms 38 rising from the hub 31, so the levers rotate with the hub and disc. The spring 33 is housed in a recess 39 which is closed by a resilient and flexible shielding cover S, preferably of rubber shaped as shown in Fig. 3, and contacting the disc 34, for thus protecting or shielding the spring against slurry or other suspension that may leak from the pump housing. The diaphragm V, preferably shaped as shown, is held in place on the disc 34 by means of chamfered plate 40 suitably clamping the tapered periphery of the flange F of the diaphragm to the disc.

Surrounding the hub 31, are the disc 34 and the centrifugal levers 35, in a cage 41, having a cylindrical body portion 42 secured to the shell 19 at one end, and having its left hand end closed by a hub-bearing head-plate 43 provided with a hub 44 terminating in a flange 45. Between the bore of this hub and the hub 31 of the cup C is an annular gap or passage 46, flow of liquid through which is either permitted or stopped by the position taken by the flexing or shifting of flange F on the septum of the diaphragm V. Preventing flow of air through that passage inward to the pump is an auxiliary impeller 47 comprising a series of curved or turbine-like blades depending from the flange 48 on the coned plate 16 that rotates with the impeller shaft 18, and cooperating in this air-excluding function with the flange 45 on hub 44.

Cage 41 is held in place by fastening to a dished plate 49 fastened to the pump housing section 15 and that in turn, with the cage, is held in place on that section of the pump housing by means of sleeve 50 secured by screw-held lugs 51. The cage 41 is apertured as at 52 and is open at its bottom as at 52ª to let out that quantity of suspension that leaks thereinto from the pump housing when the flange F of diaphragm V is open but even so, that suspension gets thrown onto the various parts that are within the cage and there is a tendency otherwise for it to creep into the bearings $B^1$.

Referring now to Figs. 4 to 7, the means for capping the open-ended fixed drum D that is carried from the tubular shell 19 in which bearing $B^1$ is mounted, comprises the cup-like expeller member C that has a cylindrical body portion 28 and a closure head 29. Inwardly projecting from the head 29 are ribs or blades 53 that preferably extend non-radially thereof, namely tangentially to the bore of that head. Inwardly projecting from the cylindrical body portion 28 of the cup C are ribs or blades 54 that preferably are shouldered as at 55 and these ribs also extend at a sloping angle away from the direction of motion of the rotatable cup. These ribs are shouldered at 55 so that the thicker part of each rib barely clears the end flange 22 on the fixed drum D, while the thinner part of the ribs barely clears the larger flange 23 on that drum. And in the same way, the bottom ribs 53 barely clear the end of the drum. This expeller cup C in rotating while in capping position around the open-ended drum D expels any suspension that may tend to enter between these parts and thus shield the bearing $B^1$ from such abrasive suspension. The angularity of the ribs are helpful in this due to centrifugal action and the circumferential grooves 25 and 24 on the hub also have an advantageous effect in such expelling.

In operation, as the impeller shaft starts up, spring 33 still presses diaphragm valve V into closing position in the annular passage 46 between the interior of the pump housing P and the cage 41. But as soon as the shaft gathers momentum, centrifugal force operates upon the weighted levers 35 to swing their weights outwardly, whereupon the short ends of the levers force the disc 34 to the right overcoming pressure of the spring 33, and this causes the diaphragm valve V to slide to the right and thus open the passage 46 to permit certain leakage into the cage 41, as before described. It is to shield the bearing $B^1$ and the spring 33 from such leaking suspended solids or slurry, that is one purpose of this invention.

In this pumping operation, the shaft 18 rotates and with it also rotates unitarily the diaphragm V, the disc 34, the levers 35, and spring 33 and the cup C, because they are all carried by hub 31 (of cup C) fastened to the shaft by the set-screw 30. The cup rotates in end-capping position around fixed open-ended drum D that is supported from the tubular shell 19 in which the bearings for the shaft are mounted. Rotation of the cup sets up centrifugal force between its interior and the exterior of the drum, which is stimulated or emphasized by the interior blades or ribs on the cup, so that positive and forceful expelling action takes place that shields the bearing $B^1$ from any slurry or other suspension reaching it. The inclined blades or ribs 54 are essential to the operation, especially at the entrance to the expeller C. Practically nothing gets into the expeller until the outside groove 25 fills up with solids, and when this happens, then the blades or ribs become flooded and material goes back. If and when the expeller and the grooves 25 and then 24, as well as the blades, become completely packed with ordinary mill tailings, as they sometimes do, a hose is turned on them for a while when running, and all the solids are washed therefrom. So an important feature of this invention is the location of the inclined blades or ribs 54 of the expeller C at the outer edge of the outside uncovered circumferential groove 25. Since the cage has slurry in it, and rotation of the parts housed within the cage tend to get covered with the slurry passing the diaphragm V, another feature of this invention is the provision of the rubber cover S for the spring between it and the disc 34, which latter keeps the cover closely enclosing that spring, and thus shielded from the slurry.

Another feature of this invention is the compactness with which this assembly can be made to condense the overall length of the pump. And still another feature is the ease of disassembly of within the cage. An operator to disassemble the parts removes the pump housing sections 14 and 15, whereupon he slides off to the left, the coned nose plate 16 from the impeller shaft 18. This exposes the dished plate 49 which is readily removed by unscrewing the screws that hold it to the head plate 43 of the cage. That plate in turn is readily removed from the cylindrical portion 42 of the cage by unscrewing the screws that hold those parts together. Thereupon, the operator can push his wrench through the open end of the cage 41 to reach the set-screw 30 and loosen it, after which he slides out from the cage and assembly that that screw holds fast to the shaft 18, namely, the hub 31 with its drum-capping cup C, the disc 34, the centrifugal levers 35, the spring 33 and its cover S, and the diaphragm valve V. After such unitary removal, the individual elements of the assembly can either be separately removed or inspected. Restoration of the parts is in the reverse order of disassembly.

I claim:

1. A shielding device for an anti-friction bearing having a supporting casing and a rotatable part encircling and supporting a rotatable horizontal shaft; drum means extending from the casing having a circumferential suspended-solids receiving groove; and horizontally extending drum-capping means rotatable with the shaft for expelling suspended solids away from entry into the space between the drum and the shaft as well as into the solids-receiving groove including shouldered ribs extending toward the drum while sloping away from its direction of rotation and terminating at the edge of the groove.

2. A shielding device for an anti-friction bearing having a supporting casing and a rotatable part encircling and supporting a rotatable horizontal shaft; drum means extending from the casing having a circumferential suspended-solids receiving groove having exteriorly thereof a plurality of flanges of which one extends from the drum a greater distance than the other; and horizontally extending drum-capping means rotatable with the shaft for expelling suspended solids away from entry into the space between the drum and the shaft as well as into the solids-receiving groove including ribs extending toward the flanges on the drum.

3. A shielding device for an anti-friction bearing having a supporting casing and a rotatable part encircling and supporting a rotatable horizontal shaft; drum means extending from the casing having a circumferential suspended-solids receiving groove; and horizontally located drum-capping means rotatable with the shaft for expelling suspended solids away from entry into the space between the drum and the shaft as well as into the solids-receiving groove, which drum-capping means has a base portion and a cylindrical portion extending laterally therefrom, and inwardly extending ribs on both portions thereof.

4. A shielding device according to claim 3, wherein the ribs on the base portion are non-radial thereof.

ELMER R. WILFLEY.

REFERENCES CITED

The following references are of record in the file of this patent:

UNITED STATES PATENTS

| Number | Name | Date |
|---|---|---|
| 1,145,516 | Schmid-Roost | July 6, 1915 |
| 1,395,480 | Burchart | Nov. 1, 1921 |
| 1,876,656 | Forsberg | Sept. 13, 1932 |
| 1,976,532 | Wilfley | Oct. 9, 1934 |
| 1,978,239 | Wheeler | Oct. 23, 1934 |
| 2,092,351 | Huntzicker | Sept. 7, 1937 |
| 2,240,782 | Jacobsen | May 6, 1941 |
| 2,272,454 | Wilfley | Feb. 10, 1942 |